United States Patent [19]

Rundborg et al.

[11] Patent Number: 4,865,339
[45] Date of Patent: Sep. 12, 1989

[54] HAND TRUCK

[75] Inventors: Bo Rundborg, Sandviken; Risto Luoto, Storvik, both of Sweden

[73] Assignee: Carl Englund, Avesta, Sweden

[21] Appl. No.: 264,272

[22] PCT Filed: Feb. 16, 1988

[86] PCT No.: PCT/SE88/00059
§ 371 Date: Oct. 12, 1988
§ 102(e) Date: Oct. 12, 1988

[87] PCT Pub. No.: WO88/06112
PCT Pub. Date: Aug. 25, 1988

[30] Foreign Application Priority Data

Feb. 17, 1987 [SE] Sweden ............................... 8700642

[51] Int. Cl.⁴ ................................................ B62B 1/04
[52] U.S. Cl. ............................... 280/47.21; 280/47.27; 414/346; 414/477; 414/490
[58] Field of Search ..................... 414/346, 477, 490; 296/20; 280/47.18, 47.2, 47.21, 47.27

[56] References Cited

U.S. PATENT DOCUMENTS

| | | | |
|---|---|---|---|
| 3,826,528 | 7/1974 | East | 296/20 |
| 3,893,687 | 7/1975 | Victor | 280/47.27 |
| 4,170,379 | 10/1979 | Eicher | 296/20 |
| 4,369,985 | 1/1983 | Bourgraf et al. | 280/641 |
| 4,561,674 | 12/1985 | Alessio | 280/47.21 X |

Primary Examiner—Charles A. Marmor
Assistant Examiner—Michael Mar
Attorney, Agent, or Firm—Natter & Natter

[57] ABSTRACT

A hand truck includes a carrying device connected to a wheel arrangement for transporting a load on a first support surface. The wheel arrangement is slidably displaceable with respect to the carrying device and can be selectively secured in a locked position when moving the hand truck on the first support surface. The carrying device including the load is transferable to a second elevated support surface when the wheel arrangement is slid toward a handle end of the carrying device. The wheel arrangement may be removed from the carrying device or alternatively pivoted for placement on the second support surface.

10 Claims, 4 Drawing Sheets

HAND TRUCK

TECHNICAL FIELD OF THE INVENTION AND PRIOR ART

The present invention relates to a manually movable truck according to the preamble of the appended claim 1.

Trucks of this kind are mainly used for moving gas bottles, carpet rolls and the like over shorter distances in building and reparing works of different kind. The distances over which the trucks are moved are mostly very short, but the trucks are nevertheless necessary, since the load displaced by means of the truck is almost quite impossible to carry by means of man's strength without risks for injuries. When such a truck is moved with a car between different working places, in order to be used on the respective working place for short distance displacement of for instance a welding device, severe problems result in the loading and unloading of the truck from and onto the supporting surface, for example the platform, on which the truck is located in the car. The difference in height between the supporting surface of the car and the supporting surface or ground on which the car stands is almost always important, for which reason some kind of inclined bridge, for instance consisting of planks, must be laid between the two supporting surfaces and the truck is rolled on this, if one is intrested to avoid manual lifting or lowering of either the entire truck with the load or the load units separately. The weight of the gas bottles is not seldom in the range of 100 kg, and it is evident that no human back can manage comfortable lifting of such a load without getting injuries at long sight. Also the rolling of the truck upwardly and downwardly an inclining bridge built is very uncomfortable, since the truck in such cases must support its entire load and it will be difficult to control and retard the movement of the truck in the rolling downwardly and it will be very hard to roll the truck upwardly on said bridge. Alternatively, but this will be very expensive, it is possible to provide the car platform in question with a lifting device.

These drawbacks of the prior trucks of this type do of course occur also in attempts to pass step-like level differences between two different supporting surfaces, such as high steps, with a truck.

SUMMARY OF THE INVENTION

The object of the present invention is to provide a truck of the kind mentioned above, in which the drawbacks discussed above of the prior art trucks are reduced to a high degree, so that the truck with the load units may be easily brought between two supporting surfaces located at substantially different levels.

This object is obtained according to the invention by providing a truck of the kind mentioned above with the characteristics defined in the characterizing part of the appended claim 1.

Through the guided displaceability of the wheel arrangement with respect to the carrying device according to the invention it is possible to bring the truck between two supporting surfaces located at essentially different levels without nearly any problem. When it is desired to load the truck together with its heavy load on a car platform it will be moved towards the platform, so that the end of the carrying device opposite to the handle will come close to the platform, after which the wheel arrangement is held with its wheels in a fixed position on the ground, while the carrying device with the load is displace with respect to the wheel arrangement and on to the platform of the car. When the carrying device is displaced so much with respect to the wheel arrangement, that almost the entire carrying device is resting on the platform, the wheel arrangement is either completely removed from the carrying device, and the comparatively light wheel arrangement is lifted with man power and laid on the platform, or pivoted upwardly past the handle and brought to resting position on the platform without separation from the carrying device. In unloading of the truck from the platform and on to the ground this is done in the opposite order, i.e. the wheel arrangement is brought to bear on the ground and thereafter the carrying device is displaced with respect to the wheel arrangement and out from the platform to a position suitable for moving the truck on the ground and in which said securing means prevents displacing of the carrying device with respect to the wheel arrangement at least in the direction in which the handle points.

The technique is the same when all kinds of level differences are passed with the truck.

Thus, the truck according to the invention may be brought between two supporting surfaces located at essentially different levels, without any humans being forced to carry out heavy lifts or expensive lifting devices or the like must be used. Also very weak persons may without problems "lift" a truck according to the invention with an important load, perhaps with the magnitude of 300 kg, on to and off the car platform, whereas said person, also without taking the ergonomic point of views in consideration, would have no chance to bring a prior art truck with the same load or the load units separatively from one of the support surfaces to the other.

Other advantage characteristics of the invention will appear from the description hereinafter and the claims.

BRIEF DESCRIPTION OF THE DRAWINGS

With reference to the appended drawings, below follows a specific description of a preferred embodiment of the truck according to the invention illustrated as an example.

In the drawings.

DETAILED DESCRIPTION OF A PREFERRED EMBODIMENT OF THE INVENTION

Figure 1:
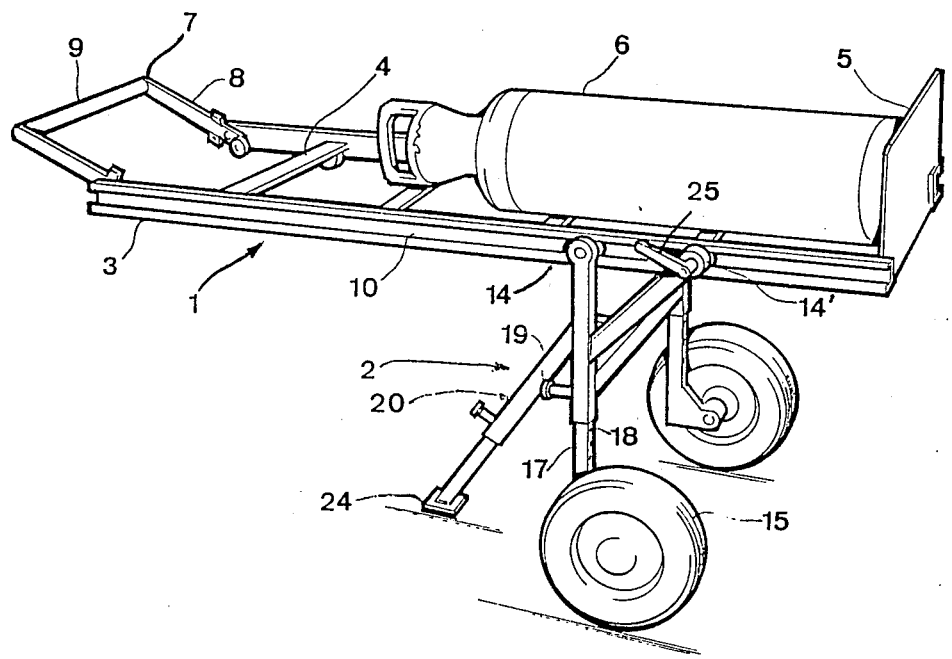
FIG. 1 is a perspective view of a preferred embodiment of the truck according to the invention in a parking position ready for transport.

The truck according to the invention is shown in FIG. 1 in a parking position, in which it stands on a support surface ready to be immediately moved upon this. In the following reference is also made to the other FIGS. 2-4. The truck has two main parts, namely a carrying device 1, which is intended to carry load units, and a wheel arrangement 2 for bearing upon the support surface on which it is desired to move the truck. The carrying device 1 is constituted by two elongated parallel beams 3, which are interconnected by a plurality of transfersal beams 4 arranged in a spaced relation. These transfersal beams 4 serve together with a plate 5 arranged on one end of the elongated beams as load units supporting portions, and for instance in FIG. 1 it appears how a load unit 6 bears on the transfersal beams 4 and in FIG. 4 how it also bears on said plate 5.

At the end of the elongated beams opposite to the plate 5 a handle 7 for manipulating the truck is arranged between the two beams 3. The handle consists of a fork with two parallelly extending legs 8, which are interconnected by a web 9. Each leg 8 of the fork is connected to a beam 3 of its own, so that the handle may be pivoted with respect to the beams between two positions (FIG. 1 and FIG. 3) in which it may be fixed.

The elongated beams 3 are provided with sidewardly directed tracks 10 along their entire length, the tracks being designed to receive rollers.

The structure of the wheel arrangement 2 will now be explained and at the same time it will be suitable to study FIG. 3. The wheel arrangement is constituted by two short parallel and hollow rectangular beams 11, rigidly interconnected by a cross bar 12. Close to one end of each rectangular beam an extension 13 is secured in such a way, that it together with the respective beam forms an U-like shape. The extension 13 extends to the perpendicular plan of the rectangular beam in question, in which also the rectangular beam ends. On their ends the two rectangular beams 11 and the two extensions 13 each have a rotating roller 14.

The wheel arrangement has also two wheels 15 intended to be used for rolling the truck on a support surface. Each wheel is rotatably connected to a connecting piece 16 extending from the respective wheel in the direction of the rotation axis of the wheel and then having a right-angled change of direction. The part 17 of the connecting piece being perpendicular to the rotation axis of the respective wheel is constituted by a rectangular beam, the dimensions of which are so adapted that it may be guidedly displaced in one of the hollow rectangular beams 11. The part 17 has recesses or holes 18 arranged at intervals, at the same time as the rectangular beams 11 have a spring-loaded pin 19, which permit variable securing of the part 17 and by that of the connecting piece 16 with respect to the rectangular beam 11, by snapping-in of the pin 19 in the hole 18 desired. In the middle of the cross bar 12 is a supporting means 20 in the form of a hollow rectangular beam with a smaller rectangular beam 21 telescopically displaceable inside itself rigidly attached. Also this inner rectangular beam has holes 22, which are arranged to co-operate with a spring-loaded pin 23 arranged on the outer beam in order to secure the inner beam in a desired position. The supporting means 20 has on its end a plate 24 for bearing on the support surface when the truck is parked, as shown in FIG. 1.

The rotating rollers 14 of the wheel arrangement are intended to be inserted and run in the tracks 10 arranged in the elongated beams 3 of the carrying device, two rollers in each track. As a consequence of this the carrying device 1 and the wheel arrangement 2 may be displaced with respekt to each other by influencing the rollers 14 to run in the tracks 10. By the fact that two rollers run in each track and these rollers have a constant mutual distance, a guided displaceability of the device 1 and the arrangement 2 is obtained without any possibility for these to rotate relative to one another. The roller 14' located most far away from the handle 7 of the carrying device in the position according to FIG. 1 is provided with a means 25 for securing this roller and by that the whole wheel arrangement with respect to the carrying device. The securing means 25 consists of a smaller lever operated to press the roller 14' in question fast within a track 10. Before moving the truck on a support surface the carrying device and the wheel arrangement are secured with respect to each other by tightening of said securing means 25, and the position in which the securing means is tightened depends upon the weight and extension of the load unit resting on the carrying device. It is of course desired that the wheels 15 of the truck are located on such a place under the carrying device that there is substantially balance relative to the vertical plane passing through the rotation axis of the wheels. However, the center of gravity of the truck and the load should be slightly displaced in the direction of the handle of the carrying device, so that the truck does not tilt without any influence in the position in FIG. 1.

Figure 2:
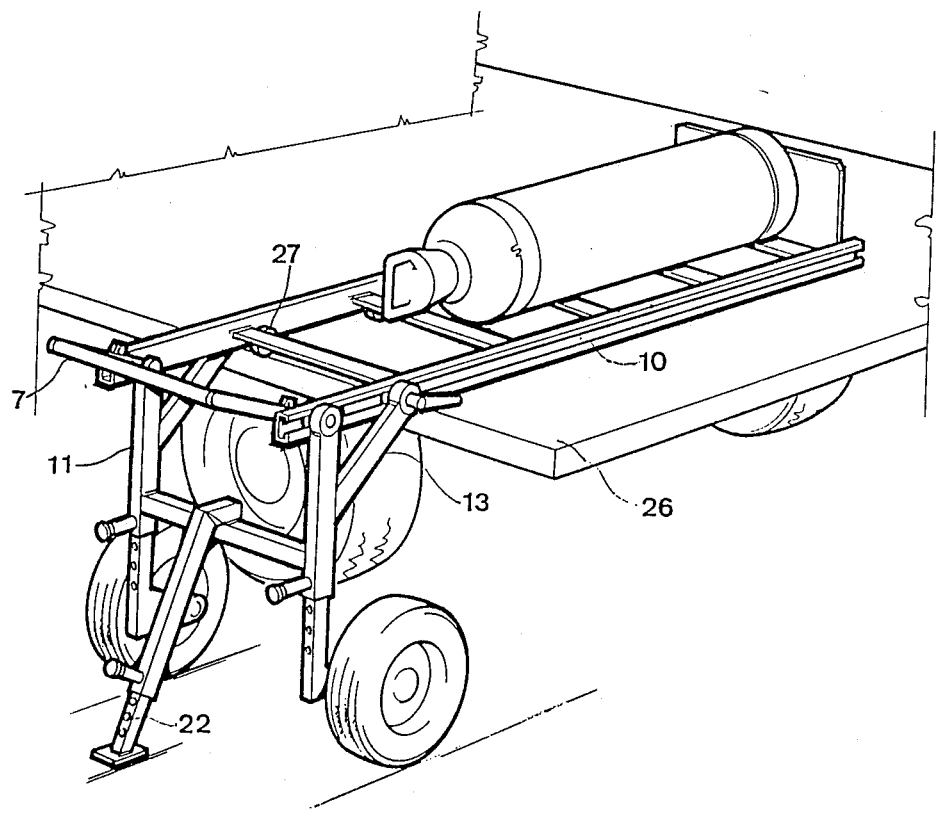
FIG. 2 is a perspective view of the truck according to FIG. 1 illustrating loading and unloading of the truck on and off, respectively, a support surface located at a higher level than the surroundings.

The way of function of the truck according to the invention will now be described with reference to FIGS. 1-3. The truck being in the position according to FIG. 1 may be rolled forwardly on the support surface on which the wheels 15 rest by lifting this end of the carrying device slightly through the handle 7 and pulling or pushing the truck backwardly or forwardly. When the truck with possibly very heavy load units 6 has been used on a working place and it together with the load shall be transported to another working place by for instance a car, the truck is placed with the end of the carrying device opposite to the handle adjacent to the car platforms 26 located at a considerably higher level than the ground. After that the securing means 25 are loosened and the carrying device 1 with the load unit 6 is pushed on to the car platform 26 while holding the wheel arrangement with its wheels in a fixed position on the ground. This holding is preferably achieved by putting a foot or the like behind the supporting means 20. The elongated beams 3 of the carrying device are provided with small wheels 27 distributed over their length (see FIG. 4), on which the carrying device is intended to rest on the car platform and which results in easy rolling the carrying device on and off said platform. In pushing the carrying device on to the latter the wheel arrangement is displaced with respect to the carrying device in the direction of the handle 7 of the carrying device. When the position according to FIG. 2 has been reached the wheel arrangement is displaced a little bit more relative to the carrying device, until the roller 14 located closes to the handle 7 in each track 10 leaves its track at the end of the respective elongated beam, whereupon the wheel arrangement may be pivoted upwardly past the handle above the rotating rollers 14' still in the tracks. After that the rollers 14' may be displaced away from the handle and by means of the securing means 25 be secured in a position according to FIG. 3 suitable for transport with the car. Starting from the position according to FIG. 2 it is also possible to bring the rollers 14' out of the tracks 10 and quite simply lay the wheel arrangement separately on the car platform. It is also possible to remove the connecting piece 16 with the wheels 15 as well as the inner beam 21 of the supporting means from the wheel arrangement should this be desired.

Each of the legs of the handle fork is provided with a non-rotating rubber wheels 28. When the position of the carrying device according to FIG. 3 is reached, the handle is pivoted to and secured in the position it has in this figure. Accordingly, said rubber wheels 28 will bear on the car platform 26 and by friction counteract displacement of the carrying device on the car platform during the car transport.

Figure 3:
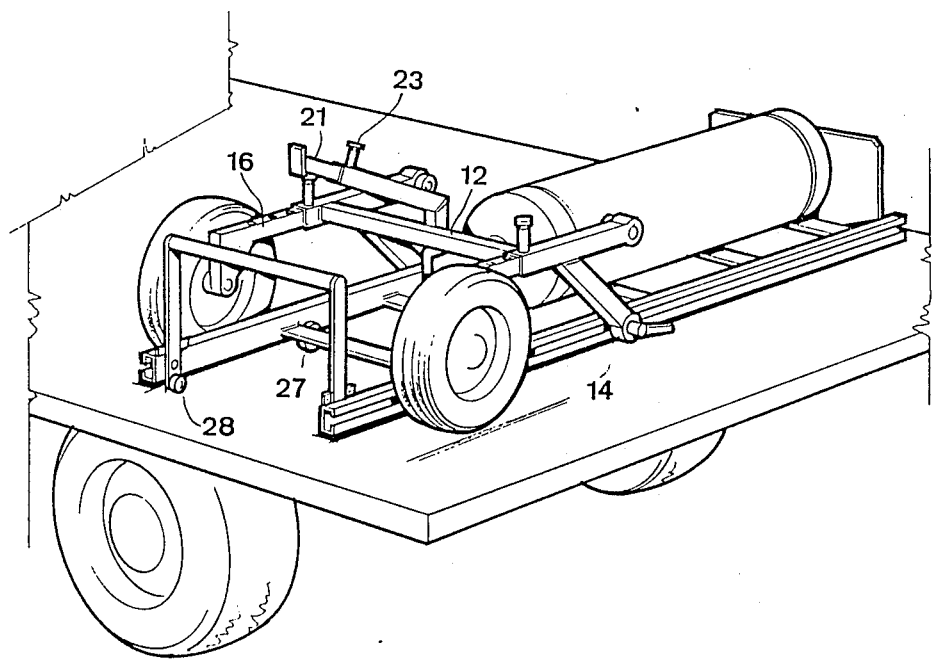
FIG. 3 is a perspective view of the truck according to FIG. 1 and 2 in a state in which it is loaded on to a higher support surface, such as a car platform.

The unloading of the truck from the car platform will be executed in the same way, but in the opposite order starting from the position according to FIG. 3. In particular when the truck is in the position according to FIG. 3 and it shall be brought into a transport position on a support surface located at a lower level, said level being not completely known, for example a loading bridge, after arriving to the position according to FIG. 2 the distance of the wheels 15 and their supporting plate 24 to the carrying device is adapted by displacing the connecting piece 16 inside the beam 11 and extending or contracting the supporting means 20. When the wheel arrangement is secured in a suitable state it is in spite of heavy load units possible to very easily push the carrying device off said higher support surface by letting the rollers 14 run in the tracks 10 and it may be secured by the securing means 25 in a position suitable for transport.

Figure 4:
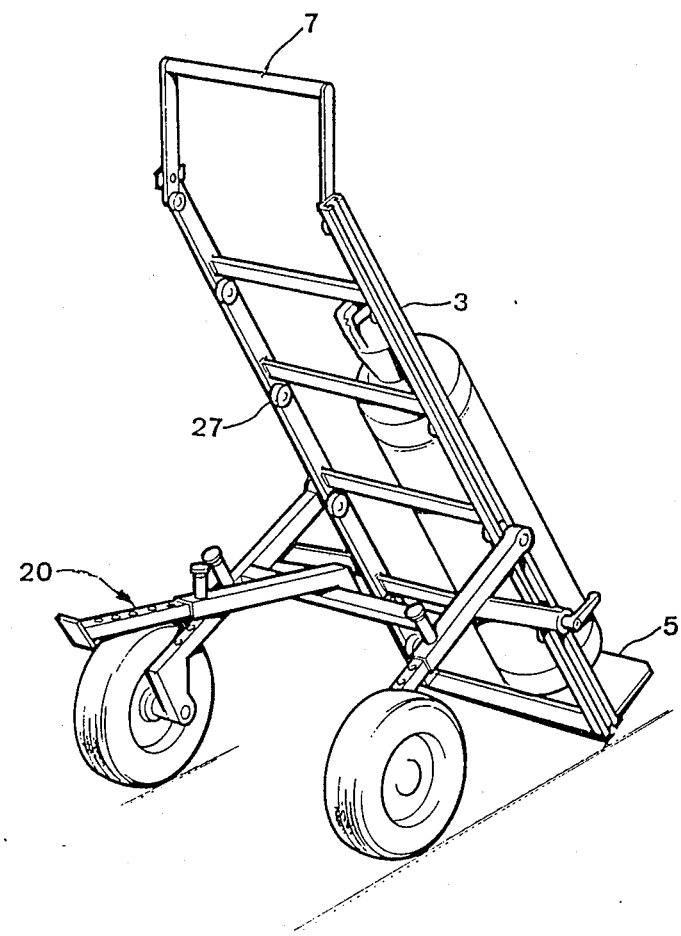
FIG. 4 is a perspective view obliquely from behind of the truck according to FIG. 1 in a second parking position suitable for unloading load units from the truck.

The truck according to the invention may also, starting from the position according to FIG. 1, be tilted to the position according to FIG. 4 through manipulating the handle 7, which position may be suitable for parking on certain work places. It is also possible to pivot the truck even more about the rear edge of the plate 5, so that it will come into a position in which the carrying device 1 and the elongated beams 3 extend substantially in a vertical plane in order to facilitate loading and unloading of the load units on to and off, respectively, the truck from ground level. When the truck is to be brought from the latter position or the position according to FIG. 4 to the position suitable for transport according to FIG. 1 a person standing behind the truck grasps the handle 7 with his hands and puts one of his feet on to the supporting means 20 close to the plate 24, after which the truck may easily be pivoted to the position according to FIG. 1.

The present invention is not in any way restricted to the advantageous embodiment described above but several modification possibilities would be apparent to a man with skill in the art to which the invention pertains, without deviating from the basic idea of the invention.

It would be possible to replace the rotating rollers 14 through guiding pieces, in the form of for example rectangular plates, displaceable in the tracks of the elongated beams.

It would also be possible to design the securing means 25 as a stop preventing displacement of the carrying device relative to the wheel arrangement in one direction more far than to a position in which at least one of the rollers 14 comes into contact with said stop, while a displacement in the opposite direction always is possible. This stop is in such a case preferably located so as to prevent the displacement of the wheel arrangement in the direction of the handle of the carrying device further than to said position, at the same time as its function may be neutralized in order to allow loading and unloading onto and off a support surface located at a higher level. The securing means 25 described above could also be replaced by a spring-loaded pin influenced by a wire, which pin then would snap into holes arranged in the elongated beams in order to secure the wheel arrangement relative to the carrying device.

When load units with standardized dimensions and weights are frequently transported by the truck according to the invention, the elongated beams may be provided with indications indicating where the wheel arrangement should be secured by means of the securing means 25 for obtaining a position suitable for transport and lying near the center of gravity of the truck.

The handle may naturally have any other possible shape desired and may also be divided into a handle for each hand of the person expected to manipulate the truck.

It would also be possible to provide the wheel arrangement with only one or more than two wheels. The elongated beams could also be of another number than described above or be replaced by suitable elements having guiding means.

It would also be possible to provide the truck with holding means, for example chains, for securing the load to the carrying device.

Finally it is once again emphasized that the truck according to the invention may be used for transporting all kinds of load units desired to be moved shorter distances, and the design of the carrying device so far as it concerns the load carrying portions may differ much in dependence on what kind of loads the truck is intended for. The carrying device may for example have continuous carrying portions extending around the load or at least laterally to the load.

We claim:

1. A hand truck for facilitating load transfer between support surfaces located at different elevations comprising an elongated frame having a handle at one end and a support plate at an opposite end, wheel support means including wheels for transporting the load on a first support surface, means for slidably securing said wheel support means to said elongated frame for selective displacement along the longitudinal length of said elongated frame, said elongated frame being pivotal about the wheel support means for raising the elongated frame to a substantially horizontal position to permit transfer to a second support surface, said wheel support means being slidably displaceable toward said handle end of the elongated frame when transferring the elongated frame to the second support surface, said slidable securing means permitting pivotal displacement of said wheel support means relative to said elongated frame for positioning said wheel support means above said elongated frame when said elongated frame is being supported by said second support surface.

2. A hand truck as claimed in claim 1 wherein the slidable securing means includes two substantially parallel beams, said beams defining track means, said wheel support means having at least two guide elements, said guide elements being slidably securable within said track means.

3. A hand truck as claimed in claim 2 wherein said guide elements are comprised of roller members, said roller members being engageable within said track means.

4. A hand truck as claimed in claim 2 wherein said beams include a plurality of beam wheel members, said beam wheel members being adapted for rollable engagement with the second support surface during transferrence of the elongated frame thereto.

5. A hand track as claimed in claim 3 wherein the wheel support means includes at least one wheel being adjustably securable to said wheel support means, said wheel being selectively displaceable for bearing engagement with the first support surface during transfer of the elongated frame from the second support surface to the first support surface.

6. A hand truck as claimed in claim 5 wherein the wheel support means includes an adjustable length leg member, said leg member having a bearing plate at one end for contact with the first support surface when the hand truck is in a parked position.

7. A hand truck as claimed in claim 5 wherein the beams are disposed at opposite sides of the elongated frame such that the rotational axis of the roller members engaged within the track means is substantially parallel to the rotational axis of the wheel whereby the wheel support means is displaceable toward the handle end and is pivotable over the handle end for positioning on the second support surface.

8. A hand truck as claimed in claim 5 wherein the wheel support means is detachable from the elongated frame.

9. A hand truck as claimed in claim 3 further including securing means for locking at least one of said roller members within said track means to prevent relative movement of the wheel support means with respect to the elongated frame.

10. A hand truck as claimed in claim 2 wherein the handle end is comprised of two legs extending from said beam members, a web member connecting said legs, with said legs being respectively positionable substantially coaxial with the beams for moving the hand truck on the first support surface, said legs being rotatably displaceable with respect to the beams when the elongated frame is positioned on the second support surface, further including friction means on at least one of said legs, said friction means being adapted to engage the second support surface to prevent movement of the elongated frame.

* * * * *